United States Patent
Weisbond

(10) Patent No.: US 7,628,429 B2
(45) Date of Patent: Dec. 8, 2009

(54) DOUBLE CONTAINMENT PRESSURE TERMINATION FITTING FOR DISSIMILAR MATERIALS

(75) Inventor: Bradley K. Weisbond, Overland Park, KS (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 11/219,375

(22) Filed: Sep. 2, 2005

(65) Prior Publication Data

US 2007/0052229 A1    Mar. 8, 2007

(51) Int. Cl.
*F16L 17/00* (2006.01)
(52) U.S. Cl. ............ 285/355; 285/45; 285/123.1; 138/89
(58) Field of Classification Search ......... 285/355, 285/123.1, 123.2, 123.3, 45, 47, 52, 53; 138/89
See application file for complete search history.

(56) References Cited

U.S. PATENT DOCUMENTS

| | | | |
|---|---|---|---|
| 191,747 A * | 6/1877 | Barrett | 138/148 |
| 345,463 A * | 7/1886 | Verner | 285/13 |
| 519,664 A * | 5/1894 | Chamberland | 210/462 |
| 2,310,351 A * | 2/1943 | Bowan et al. | 138/89 |
| 2,610,028 A * | 9/1952 | Smith | 166/325 |
| 3,249,369 A * | 5/1966 | Jahrig | 285/53 |
| 3,392,746 A * | 7/1968 | Young | 137/360 |
| 3,540,757 A * | 11/1970 | Neher | 285/21.1 |
| 3,625,018 A * | 12/1971 | Roberts | 62/55.5 |
| 3,695,642 A * | 10/1972 | DeWoody | 285/148.3 |
| 3,922,008 A * | 11/1975 | Stiner et al. | 285/41 |
| 3,928,903 A * | 12/1975 | Richardson et al. | 29/407.1 |
| 3,988,029 A * | 10/1976 | Gibson | 285/47 |
| 4,786,088 A | 11/1988 | Ziu | |
| 4,858,877 A * | 8/1989 | Carter | 248/545 |
| 5,083,821 A * | 1/1992 | Friend | 285/355 |
| 5,085,471 A | 2/1992 | Ziu | |
| 5,141,261 A | 8/1992 | Ziu | |
| 5,402,831 A | 4/1995 | Hollis | |
| 5,449,207 A * | 9/1995 | Hockett | 285/286.2 |
| 5,454,603 A * | 10/1995 | Staley, Jr. | 285/14 |
| 5,498,036 A * | 3/1996 | Kingsford | 285/123.1 |

(Continued)

OTHER PUBLICATIONS

Orion Double Containment Design & Installation.

(Continued)

*Primary Examiner*—James M Hewitt
*Assistant Examiner*—Jay R Ripley
(74) *Attorney, Agent, or Firm*—FIsh & Richardson P.C.

(57) ABSTRACT

A termination fitting for use with a double containment system includes an inner segment of pipe and an outer termination cap. The outer termination cap has an open first end and an open second end, and the open second end is threaded. The inner segment of pipe extends through the open ends of the outer termination cap so that the inner segment of pipe and the outer termination cap are coaxially arranged. The termination fitting further includes a sealing collar having an inner surface secured in a fluid-tight manner to an outer sidewall of the inner segment of pipe, and an outer threaded surface threaded within the threaded open second end of the outer termination cap to close the second end and provide a high-pressure, fluid-tight seal between the open second end of the outer termination cap and the inner segment of pipe.

6 Claims, 4 Drawing Sheets

U.S. PATENT DOCUMENTS

| | | |
|---|---|---|
| 5,690,148 A | 11/1997 | Ziu |
| 5,715,587 A | 2/1998 | Ziu |
| 6,170,891 B1 | 1/2001 | Mercado et al. |
| 6,408,887 B2 * | 6/2002 | Rahimzadeh et al. ..... 138/96 R |
| 6,464,265 B1 * | 10/2002 | Mikol ..................... 285/333 |

OTHER PUBLICATIONS

Asahi/America, Inc.; Pro-Lock™ PVC & CPVC Double Containment Piping System, May 2005, Malden, Massachusetts.

* cited by examiner

DOUBLE CONTAINMENT PRESSURE TERMINATION FITTING FOR DISSIMILAR MATERIALS

TECHNICAL FIELD

The present disclosure relates to double-containment pipe systems, fittings for double-containment pipe systems, and their assembly.

BACKGROUND

The general concept of providing a double or dual containment pipe system wherein an inner carrier pipe is concentrically located within an outer containment pipe to deliver dangerous or hazardous fluids is well known and an accepted commercial practice. Historical applications for such systems have been found in the nuclear, gas petroleum production and refining, and chemical processing industries. The inner pipe is used to transport hazardous or toxic fluid while the outer pipe is present to confine any leaks. Thus, it is also known to provide the annulus between the concentric pipes with various types of detectors and/or drainage apparatus to handle leakage.

A problem with existing systems has to do with the ability to combine different inner and outer pipe materials in an efficient manner. Different materials, or dissimilar materials, can mean materials that are of a different class (such as metallic-thermoplastic, metallic-reinforced thermosetting plastic, or thermoplastic-reinforced thermosetting plastic), or materials that are within the same class but constitute a different material, (such as within the thermoplastic family, combining a fluoropolymer within a polyolefin, or a polyolefin within another polyolefin). The reason that it is desirable to combine materials typically has to do with economics. It is desirable in many situations to combine an expensive material that is capable of handling a chemical on a full time basis within a less expensive material capable of withstanding the corrosive effects of a chemical for a limited period of time. Another major economic reason has to do with the use of a material for the outside piping capable of withstanding the corrosive effects of atmospheric conditions, thus eliminating the need for expensive coatings, cathodic protection, etc. A typical example of this would be in combining a metallic material within a nonmetallic outside material for the reasons just described. Yet a third reason has to do with structural concerns, such as where a non-metallic material is housed within a metallic outer jacket, for purposes of protecting a pipe that is buried to shallow depths from possible large "live loads" due to vehicular traffic on the ground surface.

A termination fitting is used to terminate, or end, an outer pipe while allowing the inner pipe to continue. When the inner and outer pipes are made from the same material, the termination fitting can be welded to each pipe in order to accommodate high-pressure uses for the double-containment system. However, when the inner and outer pipes are made from dissimilar materials, the termination fitting cannot be welded to each pipe in order to accommodate high-pressure uses for the double-containment system.

What is still desired is a new and improved termination fitting for a double-containment system. Among other advantages and benefits, the new and improved termination fitting will preferably be useable with double-containment systems of dissimilar materials and accommodate high-pressure uses for the double-containment system.

SUMMARY

The present disclosure provides a new and improved termination fitting for a double-containment system. According to one exemplary embodiment, the termination fitting includes an inner segment of pipe and an outer termination cap. The outer termination cap has an open first end and an open second end, which is threaded. The inner segment of pipe extends through the open ends of the outer termination cap so that the inner segment of pipe and the outer termination cap are coaxially arranged. The termination fitting further includes a sealing collar having an inner surface secured in a fluid-tight manner to an outer sidewall of the inner segment of pipe, and an outer threaded surface threaded within the threaded open second end of the outer termination cap to provide a fluid-tight seal between the open second end of the outer termination cap and the inner segment of pipe.

Among other advantages and benefits, the new and improved termination fitting provided by the present disclosure is useable with double-containment systems of dissimilar materials and accommodates high-pressure uses for the double-containment system.

According to one aspect, the inner segment of pipe and the outer termination cap are made of dissimilar materials.

According to another aspect, the collar and the inner segment of pipe are made of similar materials and the inner surface of the collar is welded in a fluid-tight manner to the outer sidewall of the inner segment of pipe.

According to a further aspect, the inner segment of pipe includes two open ends.

Additional advantages, benefits, and aspects of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

The details of one or more embodiments of the invention are set forth in the accompanying drawings and the description below. Other features, objects, and advantages of the invention will be apparent from the description and drawings, and from the claims.

DESCRIPTION OF DRAWINGS

Reference is made to the attached drawings, wherein elements having the same reference character designations represent like elements throughout, and wherein.

Like reference symbols in the various drawings indicate like elements.

DETAILED DESCRIPTION

Figure 1:
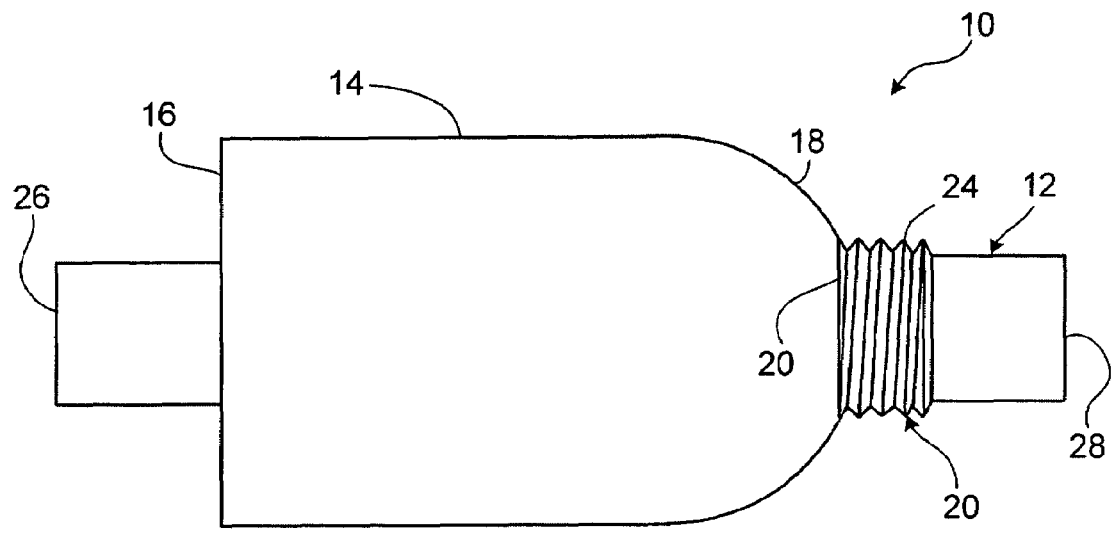
FIG. 1 is a side elevation view of an exemplary embodiment of a termination fitting constructed in accordance with the present disclosure.
Figure 2:
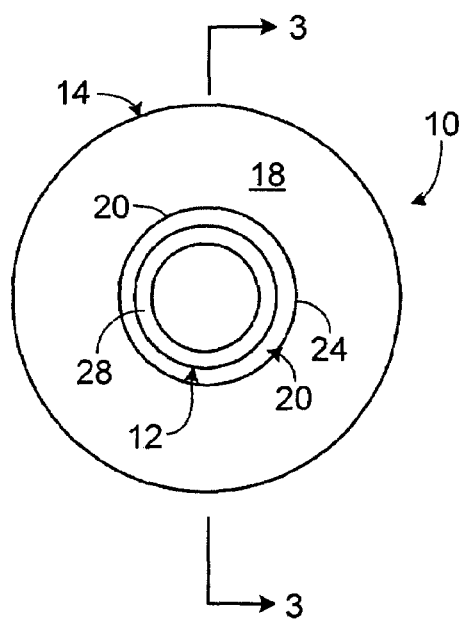
FIG. 2 is an end elevation view of the termination fitting of FIG. 1.
Figure 3:
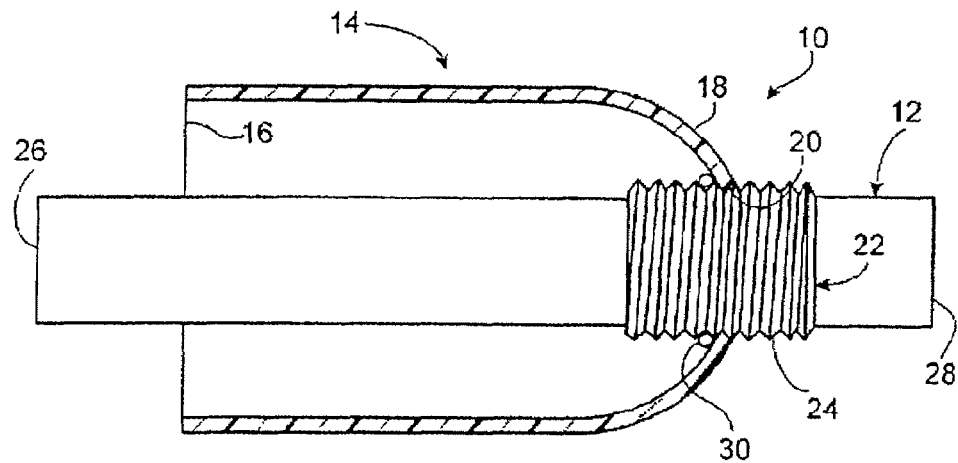
FIG. 3 is a sectional view of the termination fitting taken along line 3-3 of FIG. 2.

Referring to FIGS. 1-5, an exemplary embodiment of a termination fitting 10 constructed in accordance with the present disclosure is shown. The fitting 10 includes an inner segment of pipe 12 and an outer termination cap 14. The outer termination cap 14 has an open first end 16 and an open second end 18, and the open second end 18 includes screw threads 20. The inner segment of pipe 12 extends through the open first end 16 and the open second end 18 of the outer termination cap 14 and the inner segment of pipe 12 and the outer termination cap 14 are coaxially arranged. The termination fitting 10 further includes a sealing collar 22 having an inner surface secured in a fluid-tight manner to an outer sidewall of the inner segment of pipe 12, and an outer threaded surface 24 threaded within the threaded open second end 18 of the outer termination cap 14 to provide a high pressure, fluid-tight seal between the end 18 of the outer termination cap 14 and the inner segment of pipe 12.

Among other advantages and benefits, the new and improved termination fitting provided by the present disclosure is useable with double-containment systems of dissimilar materials (e.g., an inner carrier pipe made of more expensive PolyVinylidine DiFluoride (PVDF) an outer containment pipe made of a less expensive polypropylene) that can not be welded together, and accommodates high-pressure uses for the double-containment system.

According to one exemplary embodiment, the inner segment of pipe 12 is made of PVDF while the termination cap 14 is made of polypropylene. PVDF, or PolyVinylidine DiFluoride, is a highly non-reactive and pure thermoplastic fluoropolymer. PVDF is very expensive; its use is generally reserved for applications requiring the highest purity, strength, and resistance to solvents, acids, bases and heat. PVDF is often required for use as the inner pipe of a double containment system, while less expensive polypropylene can be used for the outer pipe. The termination fitting 10 of the present disclosure can be made from other dissimilar materials, such as a metal inner segment of pipe 12 and a plastic termination cap 14.

Figure 6:
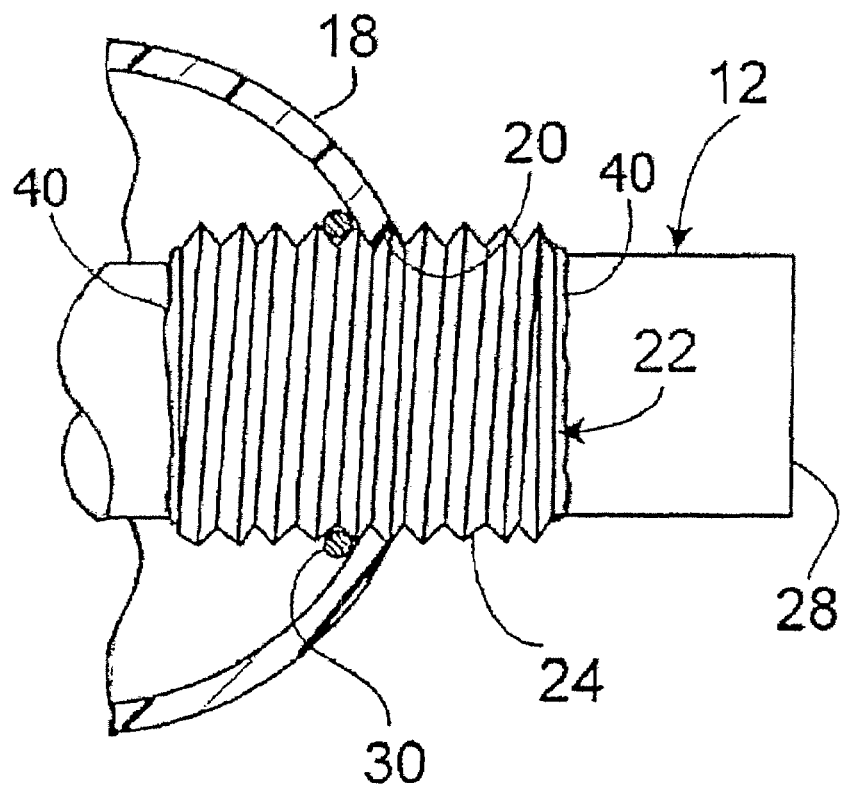
FIG. 6 is an enlarged side elevation view, partially in section, of a portion of the termination fitting of FIG. 1, wherein an exemplary embodiment of a weld between a sealing collar and an inner segment of pipe is shown.

According to one exemplary embodiment, the collar 22 and the inner segment of pipe 12 are made of similar materials and the inner surface of the collar 22 is welded in a fluid-tight manner to the outer sidewall of the inner segment of pipe 12. An exemplary embodiment of a weld 40 between the sealing collar 22 and the inner segment of pipe 12 is shown in FIG 6. The welding method may comprise butt-welding. According to one aspect, the collar 22 and the inner segment of pipe 12 may be unitarily formed from the same material.

Figure 5:
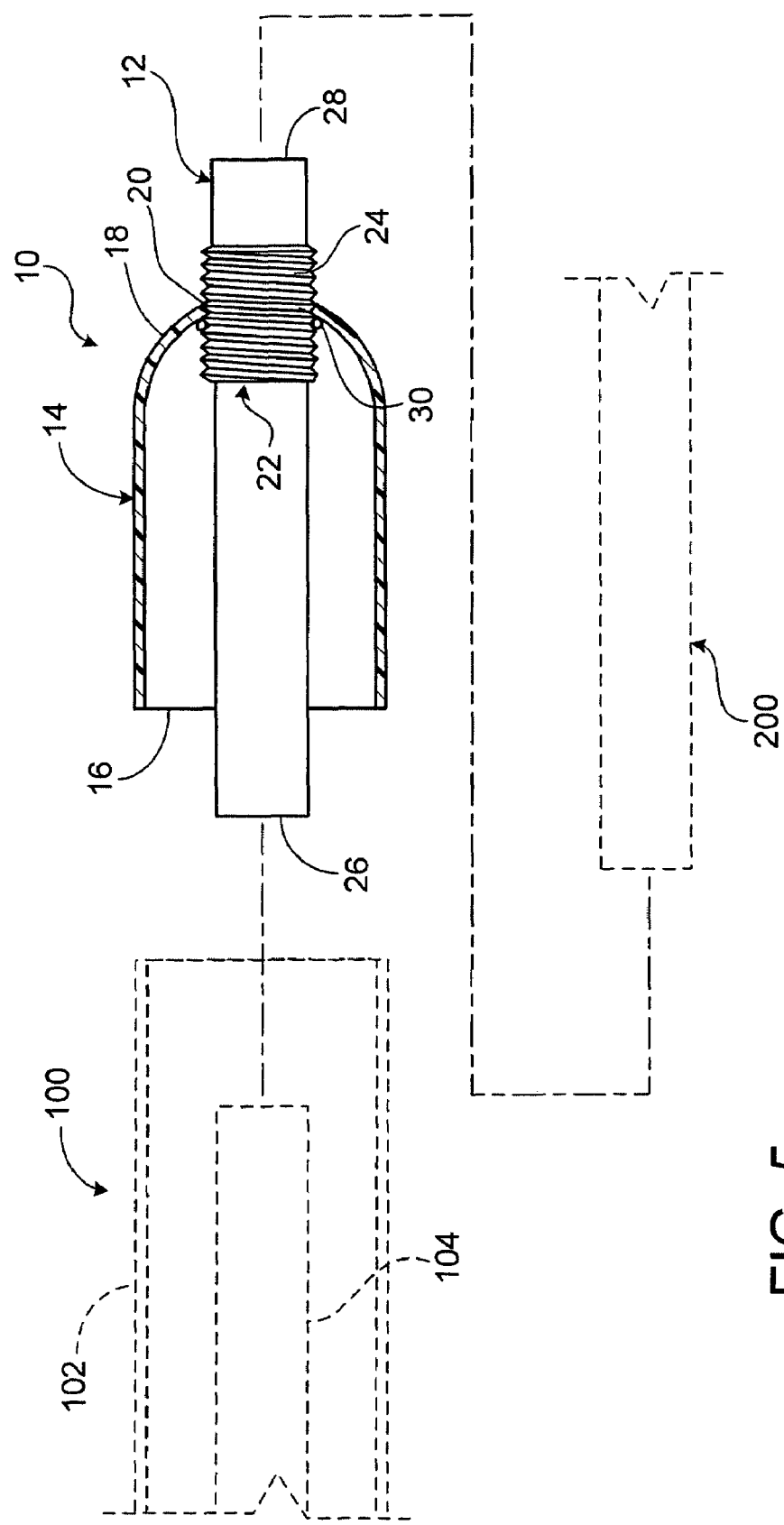
FIG. 5 is a side elevation view of the termination fitting of FIG. 1 shown being assembled to a double containment system.

In the exemplary embodiment shown, both ends 26, 28 of the inner segment of pipe 12 are open. Referring to FIG. 5, the open first end 16 of the outer termination cap 14 is connectable to an outer pipe 102 of a double containment system 100. The outer pipe 102 and the outer termination cap 14 are made from the same material and are connected together by welding. As shown, the open first end 16 and the outer pipe 102 have equal diameters and the end 16 has a flat face that extends substantially normal to a longitudinal axis of the termination fitting 10, such that the end 16 is adapted to be butt welded or fused to the end of the outer pipe 102, i.e., end-to-end butt welding. A first of the open ends 26 of the inner segment of pipe 12 is connectable to an inner pipe 104 of the double containment system 100. The inner segment of pipe 12 and the inner pipe 104 are made from the same material, have equal diameters, and are connected together by end-to-end butt welding. A second of the open ends 28 of the inner segment of pipe 12 is connectable to an uncovered pipe 200, which is also made from the same material and has a same diameter as the inner segment of pipe 12 and is connected to the inner segment of pipe 12 by end-to-end butt welding. Thus, as shown, the ends 26, 28 are also adapted to be butt welded or fused to the end of the inner pipe 104 and the end of the uncovered pipe 200. The termination fitting 10, therefore, closes the outer pipe 102 of the double containment system 100, yet allows the inner pipe 104 to continue to the uncovered pipe 200. According to another aspect, the inner segment of pipe 12 may be provide with a second end that is closed so that the termination fitting 10 closes both of the outer pipe 104 and the inner pipe 102 of the double containment system 100.

Figure 4:
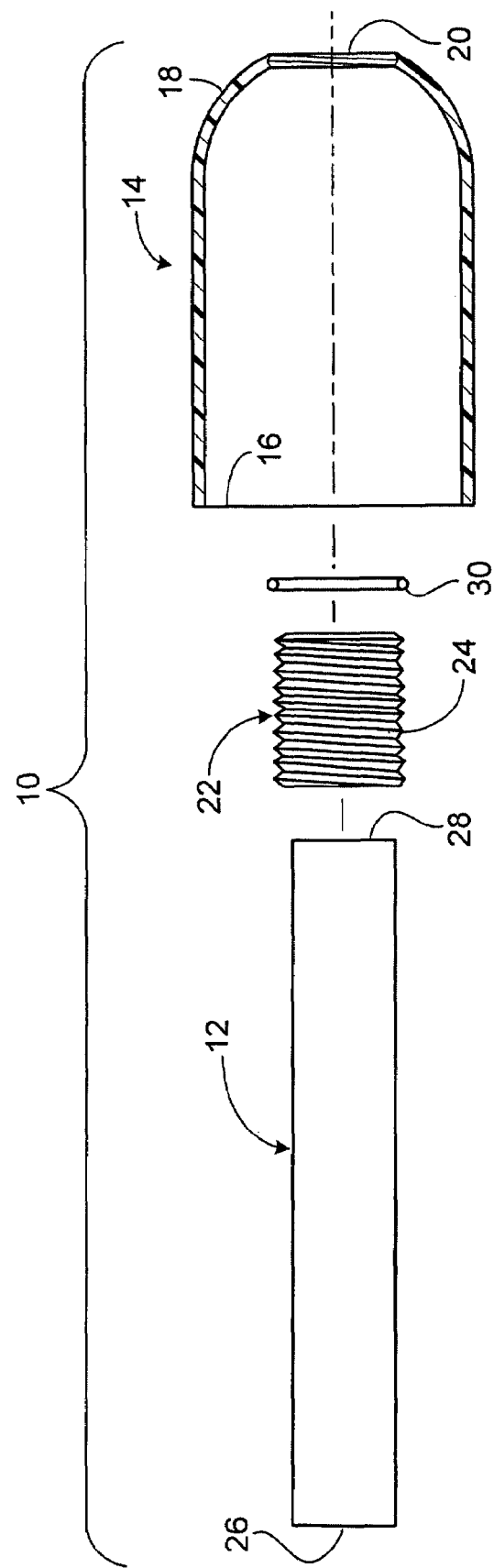
FIG. 4 is an exploded side elevation view, partially in section, of the termination fitting of FIG. 1.

As shown best in FIG. 4, the termination fitting 10 further includes an o-ring 30 received on the outer threaded surface 24 of the sealing collar 22 adjacent the threaded open second end 18 of the termination cap 14. The o-ring assists in making the threaded connection between the outer termination cap 14 and the collar 22 fluid-tight. In the exemplary embodiment shown, the outer termination cap 14 tapers radially inward towards the open second end 18.

Thus, the present disclosure provides a new and improved termination fitting that provides a pressure-resistant fluid seal at an end of an outer conduit of a double containment system. It should be understood, however, that the exemplary embodiment described in this specification has been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the termination fitting disclosed herein, and all elements thereof, are contained within the scope of at least one of the following claims. No elements of the presently disclosed termination fitting are meant to be disclaimed.

A number of embodiments of the invention have been described. Nevertheless, it will be understood that various modifications may be made without departing from the spirit and scope of the invention.

What is claimed is:

1. A termination fitting for connection to a double containment system including coaxially arranged inner and outer pipes, wherein the inner pipe is made of a first material and the outer pipe is made of a second material and the first material is unweldable with the second material, the first material and the second material being dissimilar materials, the termination fitting comprising:

an inner segment of pipe made of said first material and having at least one open end adapted to be end-to-end butt welded to an end of the inner pipe of the double containment system;

an outer termination cap having an open first end and a threaded open second end, wherein the inner segment of pipe is continuous and extends out of the open ends of the outer termination cap, and the inner segment of pipe and the outer termination cap are coaxial, wherein the termination cap is made of said second material and the open first end is adapted to be end-to-end butt welded to an end of the outer pipe of the double containment system;

a sealing collar having an inner surface secured in a fluid-tight manner to an outer sidewall of the inner segment of pipe, and an outer threaded surface threaded within the threaded open second end of the outer termination cap to provide a fluid-tight seal between the second end of the outer termination cap and the inner segment of pipe; and an o-ring received on the outer threaded surface of the sealing collar within the interior of the termination cap and adjoining the threaded open second end of the termination cap.

2. The termination fitting of claim 1, wherein the collar and the inner segment of pipe are made of weldable materials and the inner surface of the collar is welded in a fluid-tight manner to the outer sidewall of the inner segment of pipe.

3. The termination fitting of claim 1, wherein the collar and the inner segment of pipe are unitarily formed from the same material.

4. The termination fitting of claim 1, wherein the inner segment of pipe includes two open ends.

5. The termination fitting of claim 1, wherein the inner segment of pipe is made of PVDF and the termination cap is made of polypropylene.

6. The termination fifing of claim 1, wherein the outer termination cap tapers radially inward towards the open second end.

* * * * *